(12) United States Patent
Franchet et al.

(10) Patent No.: US 9,708,701 B2
(45) Date of Patent: Jul. 18, 2017

(54) DEVICE FOR OBTAINING CERAMIC FIBERS COATED BY A LIQUID PROCESS WITH A THICK METAL SHEATH

(75) Inventors: Jean-Michel Patrick Maurice Franchet, Paris (FR); Gilles Charles Casimir Klein, Mery sur Oise (FR); Gerald Sanchez, Annecy (FR)

(73) Assignee: SNECMA, Paris (FR)

( * ) Notice: Subject to any disclaimer, the term of this patent is extended or adjusted under 35 U.S.C. 154(b) by 660 days.

(21) Appl. No.: 13/577,924

(22) PCT Filed: Feb. 16, 2011

(86) PCT No.: PCT/FR2011/050332
§ 371 (c)(1),
(2), (4) Date: Aug. 9, 2012

(87) PCT Pub. No.: WO2011/101596
PCT Pub. Date: Aug. 25, 2011

(65) Prior Publication Data
US 2012/0308820 A1    Dec. 6, 2012

(30) Foreign Application Priority Data
Feb. 16, 2010 (FR) .................... 10 51092

(51) Int. Cl.
*B05C 3/10* (2006.01)
*C23C 2/00* (2006.01)
(Continued)

(52) U.S. Cl.
CPC .............. *C23C 2/003* (2013.01); *B05C 3/005* (2013.01); *B05C 3/125* (2013.01);
(Continued)

(58) Field of Classification Search
CPC ..... B05C 3/125; B05C 11/1042; B05C 3/005; Y10S 118/18
(Continued)

(56) References Cited

U.S. PATENT DOCUMENTS 3,459,587 A * 8/1969 Siple et al. .................. 427/349
2008/0292816 A1 * 11/2008 Franchet et al. ............. 427/598

FOREIGN PATENT DOCUMENTS

DE    37 18 178       12/1988
EP    0931846       *  7/1999
EP    1 995 342       11/2008

OTHER PUBLICATIONS

International Search Report Issued Apr. 28, 2011 in PCT/FR11/50332 Filed Feb. 16, 2011.

* cited by examiner

*Primary Examiner* — Laura Edwards
(74) *Attorney, Agent, or Firm* — Oblon, McClelland, Maier & Neustadt, L.L.P.

(57) ABSTRACT

A device for metal coating of fibers, for example ceramic fibers, by a liquid process, the device including a crucible containing a liquid metal bath through which a fiber is drawn to be coated with the metal, and a cooling system positioned downstream from the metal bath to solidify the metal sheath created around the fiber by capillarity. The cooling system includes at least one nozzle for ejecting a compressed gas towards the coated fiber, and the system is sized such as to solidify the metal on the periphery of the coated fiber over a length of no more than 200 mm.

8 Claims, 3 Drawing Sheets

(51) Int. Cl.
*B05C 3/12* (2006.01)
*B05C 3/00* (2006.01)
*B05C 11/10* (2006.01)
*C04B 41/00* (2006.01)
*C04B 41/45* (2006.01)
*C04B 41/52* (2006.01)
*C04B 41/81* (2006.01)
*C04B 41/90* (2006.01)
*C22C 47/04* (2006.01)
*C22C 49/14* (2006.01)
*C23C 2/38* (2006.01)
*C22C 49/11* (2006.01)

(52) U.S. Cl.
CPC ........ *B05C 11/1042* (2013.01); *C04B 41/009* (2013.01); *C04B 41/4584* (2013.01); *C04B 41/52* (2013.01); *C04B 41/81* (2013.01); *C04B 41/90* (2013.01); *C22C 47/04* (2013.01); *C22C 49/14* (2013.01); *C23C 2/38* (2013.01); *C22C 49/11* (2013.01); *Y10T 428/2958* (2015.01)

(58) Field of Classification Search
USPC ...... 118/420, 405, 425, 62, 63, DIG. 18, 69; 164/419, 461
See application file for complete search history.

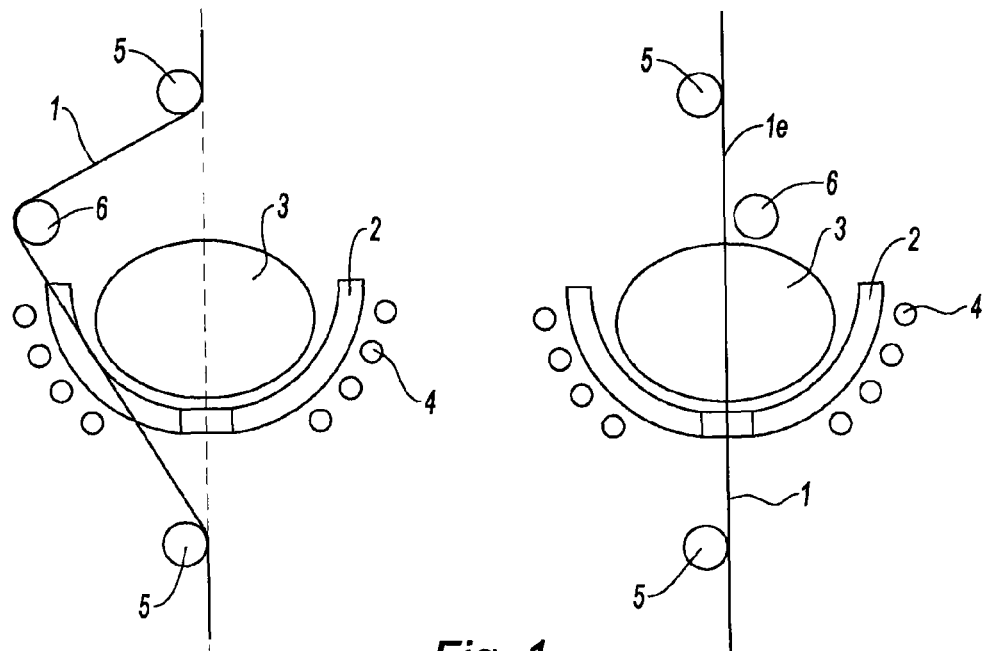
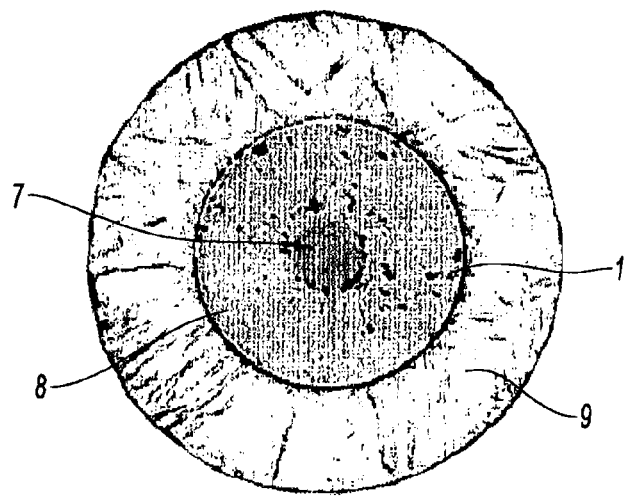
Fig. 1
Fig. 2

DEVICE FOR OBTAINING CERAMIC FIBERS COATED BY A LIQUID PROCESS WITH A THICK METAL SHEATH

BACKGROUND OF THE INVENTION

Field of the Invention

The present invention relates to the field of the coating of fibers by liquid means, and deals in particular, but not exclusively, with a device and with a method for obtaining a thick and uniform metal coating on a fiber, in industrial production conditions.

Description of the Related Art

In the aeronautics field, in particular, it is a constant objective to optimize the strength of the parts for minimum mass and size. Thus some parts may now comprise an insert of composite material having a metal matrix. Such a composite material comprises a metal alloy matrix, for example of titanium alloy, in which fibers extend, for example ceramic fibers of silicon carbide. Such fibers have a much higher tensile strength than that of titanium (typically 4000 MPa compared to 1000 MPa) and a stiffness that is typically three times greater. Hence these fibers can absorb the forces, the metal alloy matrix transferring the loads between the fibers, acting as a binder with the rest of the part, and protecting and separating the fibers, which must not be in contact with one another. Furthermore, ceramic fibers are strong, but brittle, and must necessarily be protected by metal.

These composite materials can be used in the production of disks, shafts, cylinder bodies, casings, spacers, as reinforcements for monolithic parts such as blades, etc. They can also find an application in other fields in which a volume force field is applied to a part, for example a pressure vessel such as a pressurized fluid tank.

In order to obtain such an insert of composite material, threads called "coated threads" are first formed, comprising an armature formed from a ceramic fiber, coated with a metal sheath. The metal coating imparts higher stiffness to the thread but also better toughness, which is useful for its handling. The manufacture of threads of composite material, or coated threads, can be carried out in various ways, for example by metal vapor deposition on the fiber under an electric field, by electrophoresis from metal powder, or by dip-coating the fibers in a liquid metal bath.

A method for coating fibers by dipping in a molten metal bath is described in patent application EP 1995342 or patent EP 093 1846, filed in the name of the Applicant. Patent EP 093 1846 describes a method for metal coating of fibers by liquid means, said method being more particularly, but not exclusively, intended for coating fibers with metals and metal alloys having a high melting point. In this method, the liquid metal is kept in levitation in a suitable crucible, at an appropriate temperature, in order, at least partially, to prevent contact with the walls thereof. The levitation is obtained by electromagnetic means surrounding the crucible. The ceramic fiber, kept taut by gripping means, is drawn through the metal bath. A device serves at will to make the fiber pass through the crucible so that it takes up metal while passing through the metal bath, or to make it circumvent the bath. The speed of passage of the fiber in the metal bath is set according the desired metal thickness on the fiber. In view of the viscoelastic properties of molten titanium, the speed yielding the highest titanium thickness is about 3 m/s.

One of the problems that arises in these high-speed ceramic fiber coating processes is associated with the need to cool the coated thread rapidly after its passage through the liquid metal ball. In the prior art, the cooling is carried out by a column through which the thread passes and which has a large number of cooling nozzles which eject air toward the thread when it emerges from the metal ball. It is known that the thread must be cooled to a temperature of about 500° C. to obtain complete solidification. In the case of a 140 micron thick silicon carbide fiber which emerges from a liquid titanium bath at 1700° C. and which travels at a speed of 3 m/s, it is typically necessary to have a column that is one meter high to obtain the desired solidification while ejecting air under a pressure of 2 bar.

The drawbacks associated with this method are, first, a large size of the installations, but also, and above all, a mediocre quality of the thread, because of the appearance of instabilities on the diameter of the sheathed thread which imparts a wavy appearance to the metal coating. These longitudinal instabilities are all the more marked if the relative thickness of the sheath compared to the fiber is high. One of the consequences is a risk of breakage of the coated thread, at the constrictions of its diameter, when it is wound on storage drums after coating.

To avoid this, the person skilled in the art is currently limited to relatively high fiber contents, the fiber content being defined as the ratio of the diameter of the initial fiber to the diameter of the coated thread. In fact, it is desirable to be able to produce threads having a high relative sheath thickness, that is to say, a low fiber content, and at all events, lower than the 35% stated in patent application EP 093 1846. The production of low-content threads faces the problem of longitudinal instability of sheath thickness, which is caused by the velocity shear in the meniscus of the liquid sheath that is entrained by the fiber, and by the natural tendency of a liquid to take a position in which its surface tension is minimized. Since the ideal shape for a liquid free to be deformed is a sphere, the sheath tends to be deformed to assume a shape similar to that of a string of droplets carried by the fiber. This longitudinal instability of the sheath is all the more pronounced if the fiber content is low and the time taken for cooling is long.

BRIEF SUMMARY OF THE INVENTION

It is the object of the present invention to remedy these drawbacks by proposing a method and a device which eliminates at least some of the drawbacks of the prior art and, in particular, which serves to solidify the liquid sheath before the appearance of longitudinal instabilities.

For this purpose, the invention relates to a device for the metal coating of fibers by liquid means, comprising a crucible containing a liquid metal bath through which a fiber is drawn to be coated with said metal, said device further comprising a cooling system positioned downstream from the liquid metal bath in order to solidify the metal sheath created around said fiber by capillarity, characterized in that said cooling system comprises at least one nozzle for ejecting a compressed gas toward the coated thread, and in that the system is sized to solidify the metal on the periphery of a coated thread over a length of no more than 200 mm.

The compressed gas produces a dual effect, on the one hand with the ventilation which accelerates the cooling by convection, and on the other, with the cooling generated by its expansion. Cooling over a length shorter than 200 mm serves to solidify the metal sheath forming the coating of the fiber before said sheath is deformed and causes the appearance of waviness of its diameter. This short length is essential when seeking to produce thread having a low fiber content, that is to say, with a high sheath thickness compared to the fiber diameter, without having to reduce the fiber travel speed, which can typically be about 3 m/s.

Advantageously, said nozzle is positioned at a distance of less than 5 mm from the liquid metal bath. By carrying out cooling as close as possible to the metal bath and to the meniscus of liquid metal attached to the fiber, and by solidifying the sheath as early as possible, wavy deformations of the liquid sheath are avoided.

In a particular embodiment, the cooling system comprises two series of tubes each bearing at least one nozzle, placed face to face on either side of the thread as it emerges from the liquid metal.

Preferably, the nozzle or nozzles are shaped to eject the gas in a direction making an angle of less than 30° with the travel direction of the coated thread. Such an orientation prevents the gas from returning toward the surface of the molten metal and thereby generating the cooling of the molten metal as well as potential disturbances on said surface.

Preferably, the nozzle or nozzles have the shape of a slit made in the tube and extending perpendicular to the travel direction of the coated thread.

In a particular embodiment, the device described above further comprises a mobile roller capable of shifting the fiber to make it pass through the liquid metal bath or not, and the cooling system is positioned along the coated thread, between said liquid metal bath and said mobile roller. Since the cooling system of the claimed device has a short length, it can be positioned very close to the liquid metal and avoid interfering with the existing mobile roller systems.

Preferably, in this embodiment, the cooling system comprises two series of tubes each bearing at least one nozzle for ejecting a compressed gas, said series being positioned on either side of the thread as it emerges from the liquid metal, along two planes parallel to one another and parallel to the coated thread, so that the coated thread can move between these planes, under the action of said mobile roller, to enter into or emerge from the liquid metal bath. The claimed device is thus compatible with an existing coating device, like the one described in patent EP 093 1846.

The invention further relates to a coated thread consisting of a ceramic fiber coated with a metal sheath by using a device as described above.

The invention further relates to a method for producing a coated thread having a fiber content lower than 35%, from a fiber drawn through a liquid metal bath contained in a crucible and then cooled downstream from said metal bath in order to solidify the metal sheath created around said fiber by capillarity, characterized in that it comprises the passage of said thread in front of a nozzle for ejecting a compressed gas, the gas being ejected toward the coated thread and the pressure of the compressed gas being 50 bar or higher, so that the metal on the periphery of the coated thread is solidified over a length of no more than 200 mm.

Advantageously, the travel speed of the fiber is higher than 2 m/s. A high speed, typically above 2 m/s and optimally close to 3 m/s, allows production at an industrial rate, while obtaining a low fiber content, typically lower than 35%.

In a particular embodiment, the above method is applied to the production of a coated thread made by passing a ceramic fiber through a liquid titanium bath.

BRIEF DESCRIPTION OF THE SEVERAL VIEWS OF THE DRAWINGS

The invention will be better understood, and other purposes, details, features and advantages thereof will appear more clearly from the following detailed explanatory description of an embodiment of the invention, provided as a purely illustrative and nonlimiting example, with reference to the appended schematic drawings.

In these drawings:

FIG. 1 is a schematic view of a device for metal coating of a fiber according to the prior art;

FIG. 2 is a cross section view of a ceramic fiber after the application of a metal layer by a method for coating by liquid means;

DETAILED DESCRIPTION OF THE INVENTION

Figure 3:
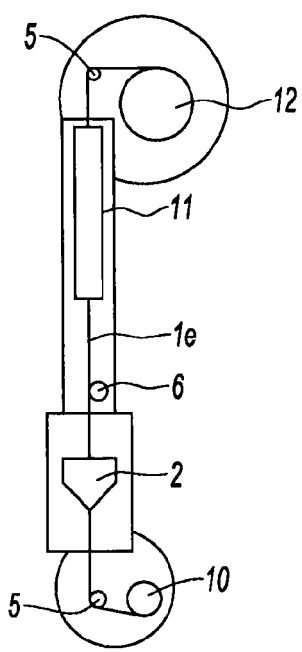
FIG. 3 is a schematic view of a device for coating a ceramic fiber by liquid means.

FIG. 1 shows, in two operating conditions, a device for metal coating of a ceramic fiber by liquid means, as described in patent application EP 093 1846 filed by the Applicant. It shows a fiber 1 passing through a crucible 2 containing a ball of liquid titanium 3. The titanium ball 3 is maintained in levitation in the crucible 2 by a magnetic field (not shown) and heated by an induction furnace 4. The fiber 1 is guided both by rollers 5 and by a mobile roller 6 which has the function either of pushing the fiber 1 outside the metal ball 3 and preventing it from taking up metal, or allowing it to pass through said ball and take up metal by coating.

FIG. 2 shows a coated thread 1e produced by passage through a liquid metal bath, the core of the thread consisting of a fiber 1, itself consisting of a carbon thread 7 covered with a ceramic layer 8 such as silicon carbide. The fiber 1 is covered with a sheath 9 of a metal such as titanium, after carrying out a coating operation by liquid means.

FIG. 3 schematically shows a device for coating a fiber by liquid means, the fiber 1 issuing from a first drum 10, and then passing into a crucible 2 filled with a molten metal and taking up a liquid metal sheath therein. The coated thread 1e then circulates in a cooling subassembly 11 before being wound on a second storage drum 12. The metal remains generally liquid from its emergence from the bath in the crucible 2 to its entry into the cooling subassembly 11.

Figure 4:
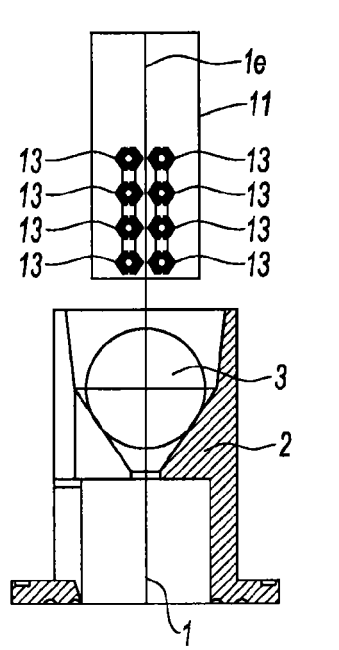
FIGS. 4 and 5 are front and profile views respectively of a device for coating a ceramic fiber with a metal layer, according to an embodiment of the invention.
Figure 5:
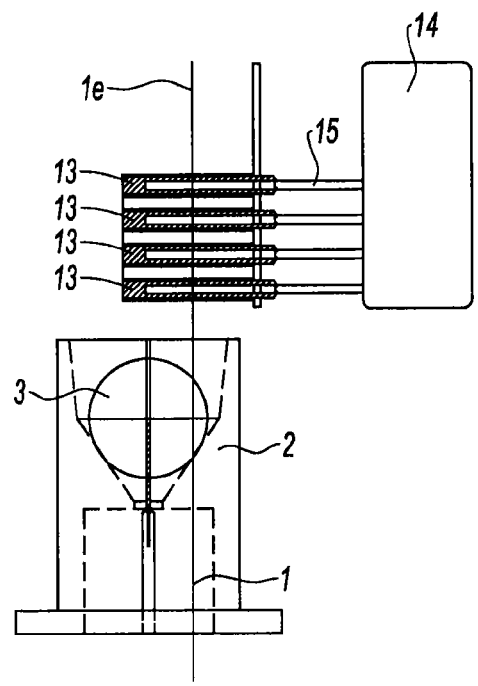

FIGS. 4 and 5 show a coating device according to the invention in which the cooler 11 consists of two series of tubes 13 placed face to face, on either side of the coated thread 1e as it emerges from the molten metal. As shown in FIG. 5, the tubes 13 are connected to a compressed gas tank 14 via connecting lines 15.

Figure 6:
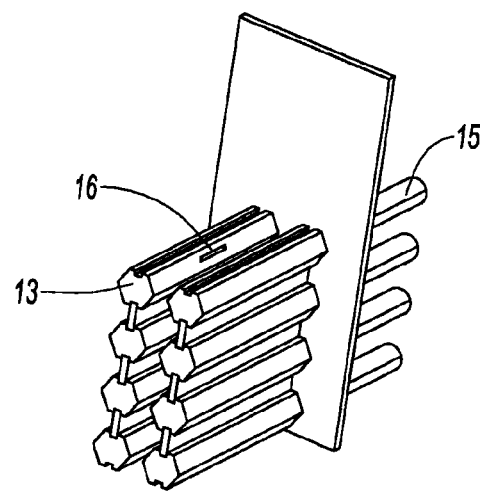
FIG. 6 is a perspective view of a subassembly for cooling a thread coated in a coating device with a metal layer according to an embodiment of the invention.

FIG. 6 shows the relative arrangement of the two series of tubes 13 and the space left free therebetween, through which the coated thread 1e passes. The tubes, in a cross section, have a substantially hexagonal shape and comprise a gas ejection nozzle 16, on their oblique side oriented toward the fiber, on the downstream side, that is to say, the side situated after the passage of the thread 1e at the level of the corresponding tube 13. This nozzle has the shape of a narrow slit, oriented along the axis of the tube 13, and it extends over a sufficient length for the gas jet emerging therefrom to clearly touch the fiber to be cooled 1. It is also relatively thin so that the distribution of the air velocity field is narrow enough and so that the jet emerging therefrom is thus substantially planar and has a high velocity.

Figure 7:
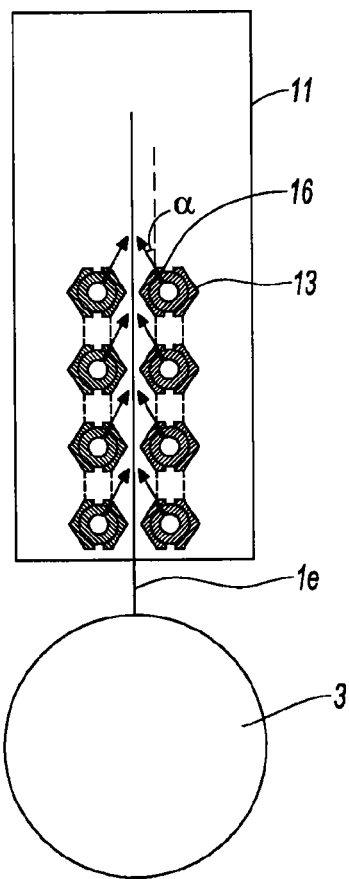
FIG. 7 is a detailed cross section view of a subassembly for cooling a thread coated in a coating device according to an embodiment of the invention.

FIG. 7 shows a cross section of the arrangement of the slit 16 inside the tube 13. This slit is oriented along a direction making an angle α, which is advantageously lower than 30°, with the travel direction of the fiber 1. The compressed gas jet ejected through the slit 16 reaches the coated thread 1*e* subsequent to the passage thereof in front of the corresponding tube 13.

A description is now provided of the operation of the coating device according to the embodiment illustrated in the figures.

The fiber 1 is made prior to its metal coating by a method known to a person skilled in the art, culminating in the creation of a ceramic gangue 8 around the carbon thread 7. This fiber 1 is stored by winding on a first drum 10 from which it is intended to be unwound to enter a coating device like the one illustrated in FIG. 1. Preferably, the fiber 1 is moved along a vertical direction, from the bottom upward, and through the molten metal on a substantially horizontal surface. On its route in the coating device, it leaves the first drum 10 and passes on rollers 5 which keep it taut and guide it for its passage through the crucible 2. A mobile roller 6 diverts it in order for it to circumvent the center of the crucible 2 and, initially, avoid interfering with the metal in the crucible.

The titanium contained in the crucible 2 is heated to a temperature close to 1700° by the induction furnace 4 to pass into the liquid state. It is also maintained in levitation in the crucible 2 by a magnetic field in order to ensure that it has no, or very little, contact with its walls. In this position, the molten metal, under the action of the surface tension exerted on its periphery, tends to assume a substantially ball shape to minimize its outer surface area. Due to the initial position given to the mobile roller 6, the fiber 1 is located entirely outside this molten metal ball. The release of the mobile roller by the operator, combined with the setting of the fiber 1 in motion, causes the passage thereof into the liquid metal ball 3 and the start of the fiber coating operation. The fiber travel speed and its lateral positioning in the molten ball are adjusted in order to obtain the desired thickness of metal which adheres to the fiber and thereby the desired fiber content for the thread 1*e* after coating.

Due to a particularly low fiber content target (typically lower than 35%), the meniscus of molten metal which adheres to the fiber is, by comparison with the fiber diameter, relatively high. This gives rise to a velocity distribution inside this meniscus that exhibits a strong shear effect. All the conditions are therefore satisfied for the appearance of longitudinal instabilities on the diameter of the coated thread 1*e*. However, this instability only appears after a certain height of extraction of the fiber 1 from the molten metal 3. The invention consequently proposes solidifying the metal sheath 9 as early as possible, upon its emergence from the metal bath, and thereby taking advantage of the stability still present just above the meniscus.

For this purpose, it places the cooler 11 as close as possible to the metal surface and carries out a very powerful cooling to solidify the sheath upon its emergence from the liquid metal and, above all, before the longitudinal instabilities appear. This objective is achieved if the cooling is considered to be terminated, that is to say, if the metal temperature on its peripheral portion is reduced to a value lower than 500° C., at the end of a length that does not exceed 200 mm.

To achieve this objective, the device makes the fiber 1 pass between the tubes 13 at the speed of about 3 m/s, which corresponds to the speed that yields the highest metal sheath diameter for a given fiber diameter and thereby, by selecting very small diameter fibers 1, serves to obtain fiber contents lower than 35%.

The nozzles 16 eject air on the coated thread 1*e*, from its emergence from the metal bath, along a direction oriented upward to ensure that part of the gas stream, by returning downward, on the one hand, does not disturb the heat transfer of the molten metal by cooling it and, on the other hand, does not disturb the surface of this metal by creating undesirable oscillations. To avoid this, the direction along which the gas stream is oriented must not deviate from the travel direction of the thread 1*e* by an angle greater than 30°.

Secondly, it is important to cool the metal attached to the fiber 1 extremely rapidly, and for this purpose, to have an extremely efficient cooling system. The one proposed by the invention includes the sending of a jet of compressed gas at high pressure, between 50 and 200 bar, in the immediate vicinity of the thread 1*e* to be cooled, that is to say, at distances of between 2 and 5 mm and preferably about 2 to 3 mm. The high pressure first allows high ventilation and heat removal, and also causes considerable cooling due to the expansion of the gas, from its storage pressure to atmospheric pressure. This dual effect causes the intense cooling desired.

The very narrow slit shape given to the nozzle 16 also participates in generating good cooling. The small cross section of this nozzle, combined with the high pressure of the cooling gas, causes a high gas speed at the outlet of the nozzle 16 due to the high ΔP existing between the interior of the tube 13 and the exterior. The high speed improves the convection and heat removal.

It is important to note that the arrangement of the tubes 13, which are only fixed to a partition on a single side, allows the fiber 1 to enter into and emerge from the crucible system 2, in response to the position given to the mobile roller 6. The placing of the cooler 11 as close as possible to the metal bath 3 therefore does not prevent the use of a coating device of the type of that of the prior art described in patent EP 093 1846. The limited height of the cooler 11, which generally does not exceed 200 mm, also makes its integration in the device relatively easy.

Finally, to enhance the cooling capacity, it is preferable to position the compressed gas tank 14 immediately next to the tubes 13, so as to improve the pressure differential between the upstream and downstream sides of the slit 16 by avoiding the pressure drops that occur along the connecting lines 15.

With such a device, the temperature of the coated thread 1*e* can be lowered, on its periphery, to about 500° C., that is to say, to a temperature at which the metal is solidified, from a distance of about 100 mm after it emerges from the metal bath 3. With pressures between 50 and 200 bar in the gas tank 14, the metal sheath 9 can be solidified, at least on its peripheral surface, after a travel distance varying from 100 to 200 mm. The longitudinal instability of the metal sheath 9 has too little time to occur significantly over such short cooling heights. This makes it possible to obtain coated threads 1*e* with particularly low fiber contents, and in any case much lower than 35%, without longitudinal instability on the diameter of their metal sheaths. These coated threads are obtained without deteriorating the production yield, because they can be produced while retaining a high fiber travel speed, that is to say, close to the optimal value of 3 m/s employed in the prior art.

To obtain good compactness of the device and to remain within the 200 mm dimension, various configurations are feasible, which are distinguished from the device described by the number of tubes 13, by the thickness of the slit 16 or even by the pressure in the compressed gas tank 14.

Finally, the compactness of the device makes it feasible to install a plurality thereof in series, without resulting in excessively high production columns, and thereby to obtain higher metal sheath thicknesses, and therefore even lower fiber contents.

Although the invention has been described in relation to a particular embodiment, it obviously comprises all technical equivalents of the means described and combinations thereof if they fall within the scope of the invention.

The invention claimed is:

1. A device for metal coating of fibers by liquid means, comprising:
    a crucible containing a liquid metal bath through which a fiber is drawn to be coated with the metal;
    a cooling system positioned downstream from the liquid metal bath to solidify a metal sheath created around the fiber by capillarity,
    wherein the cooling system comprises at least one tube comprising an oblique lateral face oriented toward the fiber, on the downstream side of said tube relative to the motion of the fiber, and a nozzle provided in said face which is oriented toward the fiber, for ejecting a compressed gas shaped to eject the gas in a direction making an angle of less than 30° with a travel direction of the coated fiber and positioned at a distance of less than 5 mm from the liquid metal bath, and
    wherein the system is sized to solidify the metal on the periphery of the coated fiber over a length of no more than 200 mm.

2. The device as claimed in claim 1, wherein the cooling system comprises two series of tubes each bearing at least one nozzle, the tubes being placed face to face, on either side of the coated fiber as the coated fiber emerges from the liquid metal.

3. The device as claimed in claim 2, wherein the at least one nozzle has a shape of a slit made in the tube extending perpendicular to the travel direction of the coated fiber.

4. The device as claimed in claim 1, further comprising a mobile roller configured to shift the fiber so that the fiber passes through the liquid metal bath or not,
    wherein the cooling system is positioned along the coated fiber, between the liquid metal bath and the mobile roller.

5. The device as claimed in claim 4, wherein the cooling system comprises two series of tubes each bearing at least one nozzle for ejecting a compressed gas, the series being positioned on either side of the coated fiber as the coated fiber emerges from the liquid metal bath, along two planes parallel to one another and parallel to the coated fiber, so that the coated fiber can move between these planes, under action of the mobile roller to enter into or emerge from the liquid metal bath.

6. The device as claimed in claim 1, wherein the travel direction of the fiber is a vertical direction.

7. The device as claimed in claim 1, wherein each tube has a substantially hexagonal shape in cross section and bear six lateral faces.

8. A device for metal coating of fibers by liquid means, comprising:
    a crucible containing a liquid metal bath through which a fiber is drawn to be coated with the metal;
    a cooling system positioned downstream from the liquid metal bath to solidify a metal sheath created around the fiber by capillarity,
    wherein the cooling system comprises at least one tube having a substantially hexagonal shape in cross section, and at least one nozzle oriented toward the fiber and provided on an oblique lateral side of said hexagonal tube at a downstream side of said tube relative to the motion of the fiber, for ejecting a compressed gas shaped to eject the gas in a direction making an angle of less than 30° with a travel direction of the coated fiber and positioned at a distance of less than 5 mm from the liquid metal bath, and
    wherein the system is sized to solidify the metal on the periphery of the coated fiber over a length of no more than 200 mm.

* * * * *

UNITED STATES PATENT AND TRADEMARK OFFICE
CERTIFICATE OF CORRECTION

PATENT NO. : 9,708,701 B2
APPLICATION NO. : 13/577924
DATED : July 18, 2017
INVENTOR(S) : Jean-Michel Patrick Maurice Franchet et al.

Page 1 of 1

It is certified that error appears in the above-identified patent and that said Letters Patent is hereby corrected as shown below:

In the Specification

Column 6, Line 33, change "the high LP existing" to --the high ΔP existing--.

Signed and Sealed this
Second Day of April, 2019

Andrei Iancu
*Director of the United States Patent and Trademark Office*